United States Patent Office 3,203,113
Patented Aug. 31, 1965

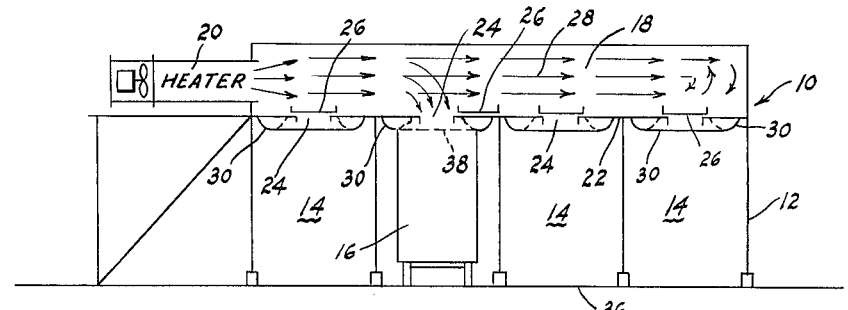
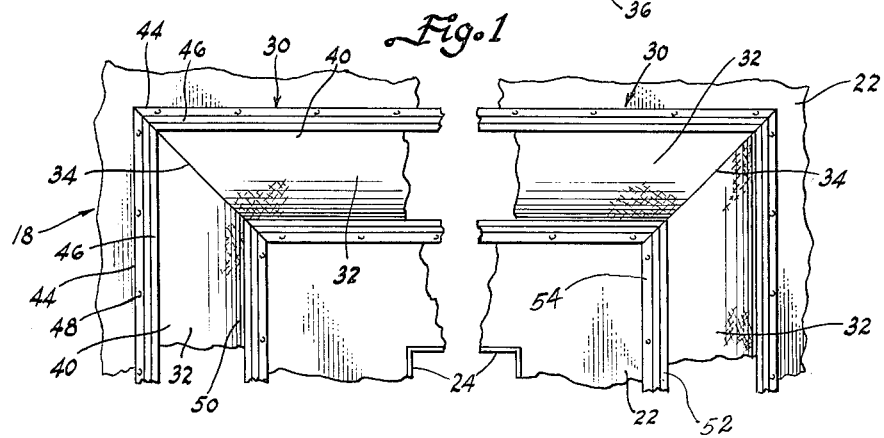
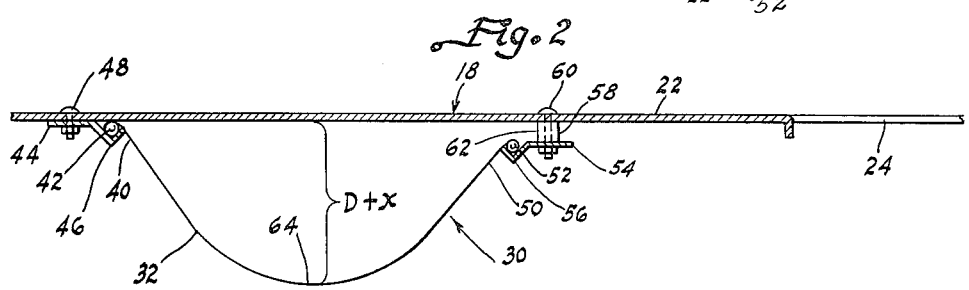
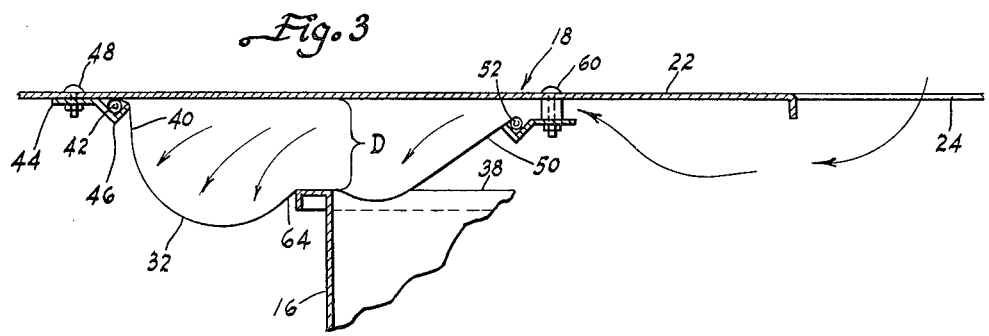

3,203,113
CROP DRYING DEVICE
William E. James, Ephrata, James G. Greiner, Lancaster, and Paul N. Exstrom, East Petersburg, Pa., assignors to Sperry Rand Corporation, New Holland, Pa., a corporation of Delaware
Filed Apr. 23, 1962, Ser. No. 189,444
7 Claims. (Cl. 34—218)

This invention relates to improvements in crop-drying mechanism and, more particularly, to duct connector means for use in connecting a duct through which drying air passes to the open top of a wagon having sides and/or a bottom, which are perforated adequately to permit the escape of drying air therethrough, more or less in an even manner and so constructed as to maintain a desired pressure of drying air within the wagon in order that it will penetrate crops therein being dried, such as baled hay, etc.

In accordance with agricultural practices in former years, forage crops, such as hay, were cut and left in the field where it was cut to be dried by the warmth of the sun and atmospheric air prior to the hay being baled. In order for the forage crop to have highest nutritional value for cattle and other herbivorous animals, it should be cut while still in green condition, whereby it is necessary to evaporate a substantial amount of moisture from the cut crop before storing it. Inclement weather also sometimes interfered with baling operations, and if the cut crop were not dried adequately before baling, the baled crop usually would become moldy throughout so as to be unfit for use. Also, the moisture of such baled forage products might be sufficiently high when baled that, when stored in closely piled conditions, for example, such as in a barn, the moist crop could be capable of generating sufficient heat to cause spontaneous combustion.

Modern harvesting methods for forage crops, including hay and others of various kinds such as clover, alfalfa and the like, advocate cutting the crop in green condition at the height of its nutritional valve. However, rather than rely upon natural conditions to effect the major amount of the drying of the crop, especially as such conditions might be affected by the whims of weather, modern practices have quite extensively adopted the use of artificial drying of forage crops, especially in baled conditions. This can be done by loading bales of such crops in a wagon having an open top surrounded by air-tight sides and a perforated bottom. Drying sheds, or similar buildings, are used to support an overhead duct to which heated air preferably is delivered from suitable generating means. Discharge openings are provided in the lower wall or face of such duct in order that the heated air might be discharged in substantial quantities and at appreciable pressures greater than atmospheric into the open top of such wagons loaded with baled forage crops in order that the heated air might pass through the bales and dry the same by entraining the moisture from said crops in the air discharging through the perforated bottom of the wagon. Such drying operation is continued until the bales of agricultural crops are dried adequately that no molding will occur, and they also may be stored safely in piled condition within a barn, or the like.

One of the problems encountered up to the present time in regard to the foregoing practice has been in connection with effecting satisfactory means to connect the air exhaust openings in the lower wall of the duct with the open tops of the wagons when placed beneath said openings. Various expedients have been tried, such as canvas shrouds or sleeves extending around the exhaust openings and connected at the upper ends thereof to the bottom wall of the duct and being sufficiently long to enclose the upper ends of the side of the wagon. Sometimes drawstring arrangements have been utilized to effect a sealing engagement between the lower end of such fabric shroud and the wagon. Such shrouds had to be of appreciable length, however, and draping the same along the upper ends of the sides of the wagon, as well as removing such shrouds therefrom, when the drying was completed, have presented extensive difficulties.

Other attempts have been made to provide fabric or other types of flexible vertical sleeves or walls which extend from the lower wall of the duct downwardly against the inner surfaces of the sides of the wagon, whereby the pressure of the air discharging from the duct into the wagon served to press the flexible sides of the connector means against the inner surfaces of the sides of the wagon. However, as in regard to the above-described shroud means, difficulties have been experienced, particularly in regard to both placing such flexible connectors within the upper portion of the wagon, as well as removing the same therefrom when drying has been completed. Tearing of such connectors and shrouds frequently occurred incident either to affixing them in operative position, or in removing them therefrom so as to free the wagon for removal from the drying shed.

Other types of telescoping connecting means, both of metal as well as flexible sheet material, have been used, but, in substantially all instances, the means for operating and controlling the connecting means has been highly unsatisfactory.

The principal object of the present invention is to provide an extremely simple, foolproof, easily installed, and durable sealing means carried by the lower wall of the duct of the drying shed and engageable in a horizontally slidable manner with the upper edges of the sides of a wagon containing agricultural crops to be dried, effective sealing engagement between such sealing means and the upper edges of the sides of a wagon being insured by suitable inflation of the sealing means.

Another object of the invention is to provide such inflatable-type sealing means with inlet means to receive air, under pressure, from the duct incident to being discharged into the open top of a wagon, such inlet means being so arranged that the internal pressure of the sealing means will retain the same in substantially air-tight engagement with the upper edges of the sides of a wagon, regardless of the amount of pressure of the drying air being discharged into the wagon.

A further object of the invention is to construct said sealing means from flexible strip-like material in such a manner that the intermediate portions thereof between the opposite edges of such strip-like material are disposed substantially horizontally and are spaced downwardly from the duct a greater distance than that which the upper edges of the sides of a wagon are spaced below the lower wall of the duct when a wagon is placed therebetween, whereby said sealing means may drape, or somewhat balloon, relative to opposite sides of the upper edges of the wagon and thereby insure sealing engagement between the duct and top of the wagon.

Still another object of the invention is to form the sealing means from strips of flexible sheet material, which preferably are impervious, and such strips are connected at the transversely spaced outer edges thereof to the lower wall of the duct in a configuration approximately the same as that of the outline of the upper edges of the sides of a wagon, the innermost edges of said strips of sealing material preferably being evenly spaced a limited distance below the lower surface of the duct in order to insure even admission of inflating air, under pressure, longitudinally throughout the sealing means.

Still a further object of the invention is to provide extremely simple and inexpensive, yet highly effective, supporting and clamping means for the flexible strip-type sealing material and the air-inlet means afforded by said supporting means to permit the ingress of air under pressure between the flexible means and the lower wall of the duct, and this arrangement operates in such manner, automatically, that there is no need for any valve to regulate the inlet or exit of air relative to the sealing means, yet the pressure within the sealing means is always adequate to insure that it will effect adequate sealing between the duct and the upper ends of the sides of a wagon to effect maximum efficiency of the drying air to entrain moisture when passing through the crop contained within the wagon.

Details of the foregoing objects and of the invention are set forth in the following specification and illustrated in the accompanying drawing comprising a part thereof.

In the drawing:

FIG. 1 is a simplified, diagrammatic side elevation of an exemplary drying shed having a plurality of bays respectively to receive wagons containing agricultural crops and showing an exemplary duct in the upper portion of the shed, the duct having discharge means for controlled delivery of drying air to the crop wagons.

FIG. 2 is a fragmentary, bottom plan view, on a much larger scale than employed in FIG. 1, of the exemplary sealing means illustrated generally in FIG. 1, and comprising the essential feature of the present invention, said view being partly broken away to foreshorten the same.

FIG. 3 is a fragmentary, vertical sectional view showing a portion of the lower wall of the duct illustrated in FIGS. 1 and 2 and an exemplary disposition of the flexible strip-type sealing means when disposed in rest positition, as when not engaging the upper edge of a wagon.

FIG. 4 is a view similar to FIG. 3, but showing the sealing means arranged in operative sealing engagement with the upper edge of one side of an exemplary crop wagon.

Referring to FIG. 1, an exemplary drying shed 10 is shown in side view, the same preferably being somewhat skeleton-like and comprising a plurality of vertical supports 12 defining bays 14 therebetween which respectively receive a wagon 16 of the type preferably used for drying of crops and including a perforated bottom, details of which are not shown because they are well known in the art.

Disposed in the upper portion of the drying shed 10 is a horizontal air duct 18 of suitable transverse size to carry sufficient drying air discharged from the self-contained heating unit 20 to effect drying of crops contained in wagons disposed in the bays 14.

The cross-sectional shape of duct 18 is not shown. It will be understood, however, that said duct either may comprise the entire enclosed upper portion of the drying shed 10, or it may be either rectangular or square in cross-section, or any other suitable shape. Preferably, however, the lower wall 22 of the duct is substantially flat and provided with a plurality of air exhaust openings 24 of suitable area and shape to discharge an adequate amount of crop-drying, preferably heated, air from the self-contained heating and blower unit 20, through the duct 18, and discharging the same through the exhaust openings 24 into the open tops of the crop-containing wagons 16 to provide adequate drying of all the crops contained in the wagons at any one time within a reasonable period of time.

Preferably, the shape of the openings 24 is generally similar to that of the outline of the open top of the wagon 16, but the area of each of said openings is less than that of the area of the open top of the wagon, as is illustrated generally in exemplary manner in FIG. 1. Further, the openings 24 preferably are provided with closure means, which, in FIG. 1, are illustrated in exemplary manner as slidable sheet-metal covers 26, which are horizontally slidably mounted by suitable guideways, not shown, relative to the openings 24 in order that those openings over the bays within which wagons are not disposed positioned for drying the crops therein may be closed so as to conserve the heated drying air passing through the duct 18, as indicated generally by the arrows 28.

The duct connector sealing means 30, which comprises one of the essential features of the present invention, preferably consists of elongated strips 32, which are of reasonable width and are formed from any suitable, preferably impervious, flexible material, such as rubberized canvas, flexible sheet plastic of appropriate composition, or the like. Said strips are arranged to surround the exhaust opening 24, but, preferably, are spaced laterally outwardly therefrom on the horizontal lower wall of the duct 18.

The width of the strips of sealing material 32 may vary, in accordance with desired practice, and particularly in accordance with the sizes of the wagons to be accommodated within the bays 14. However, in regard to average conventional sizes of wagons, strips of the order of between 16″ and 24″ in width are appropriate. Also, the lengths of the various strips correspond respectively to the lengths of the side and end walls of the wagon, the upper edges of which define the open top of the wagon. Such wagon bodies usually are rectangular, whereby the general outline of the sealing strips 32 is rectangular, and the ends of the various strips, which are arranged at right angles to each other, are connected preferably in air-tight relationship along diagonal sealing lines 34, shown best in FIG. 2.

The lower wall 22 of the duct 18 is positioned above the floor 36 of the drying shed 10 slightly higher than the height of the sides of the wagon 16, as illustrated in exemplary manner in FIG. 4. It will be assumed that the upper edges 38 of the sides of the wagon are spaced a distance identified D, relative to a bracket shown in FIG. 4, below the lower wall 22 of duct 18. In order that adequate sealing may be effected between the upper edges 38 of all sides of the wagon 16 and the lower wall 22 of duct 18, the flexible sealing strip 32 of the sealing means 30 must be of adequate width to form a catenary, as shown in cross-section in exemplary manner in FIG. 3, which extends below the lower wall 22 of duct 18 a distance equal to $D+X$, wherein X represents an additional increment of distance of a desired amount, depending upon relative heights of the upper edges of the wagon 16 and the lower wall 22 of the duct 18 above the floor 36 of the drying shed 10, for purposes to be described.

For ease of construction and economical cost, the lower wall 22 of the duct 18 preferably is formed from appropriate sheet-metal, such as galvanized sheet steel. In order to secure the elongated strips 32 of the sealing means to the lower surface of the lower wall 22, the laterally outermost edge 40 of each of the strips 32 is secured firmly and in air-tight relationship against the lower surface of lower wall 22 of the duct 18 by any suitable means, such as by rolling said outermost edge around a rod or rope 42, for example, which may be disposed within an appropriate hem formed in the strips of material 32, either to stiffen or add thickness to said edge. A clamping strip or bar 44, which may be either somewhat flexible or rigid, has a channel 46 formed therein along one edge and is affixed by bolts 48 against the lower surface of lower wall 22, the channel 46 being sufficiently shallow that it will firmly clamp the outer edge 40 and any rod or rope 42 associated therewith against the lower surface or lower wall 22 in firm and air-tight relationship.

The laterally innermost edge 50 of each of the strips 32 likewise preferably is either wrapped around or provided with a hem containing a rod or rope 52, which serves to stiffen the same and maintain said inner edge 50 substantially straight and in condition to be readily supported under all conditions of operation.

The inner edges 50 of the sealing strips 32 are supported in spaced relationship relative to the lower wall 22 of the duct 18 in the exemplary manner illustrated in FIGS. 3 and 4, by means of elongated, horizontal supporting means 54 provided with either an open or closed channel 56 extending along its inner edge. FIG. 4 illustrates a channel which opens upwardly, and within which the inner edge 50 and an exemplary stiffening rod member 52 therein are received for support by gravity. No clamping of the inner edge of the sealing strips relative to the supporting strip 54 is required, especially if the ends of the stiffening members are connected together.

If desired, the supporting means 54 may be resilient and shaped, in cross-section, to comprise a somewhat C-shaped, closed channel within which the enlarged inner edges 50 of strips 32 are disposed by snap-action, it being understood that the normal space between the edges of the channel is less than the diameter of edges 50 with the member 52 therein. The resilience of the supporting channel means 54, in this variation of the invention, is sufficient to prevent accidental separation of the edges 50 of strips 32 therefrom.

The strip 54 is spaced below the lower wall 22 of the duct 18 a suitable distance in order to provide an entrance means or space 58, which preferably extends longitudinally along the supporting strip 54, except where interrupted by a series of spaced connecting bolts 60 which extend through the lower wall 22 of duct 18 and are surrounded by spacing sleeves 62.

As best can be visualized from FIG. 4, when a wagon 16 is disposed in operative relationship beneath one of the air exhaust openings 24 in the lower wall of the duct 18, the upper edges 38 of the sides of the wagon will slidably engage the horizontal lower surface portion 64 of the sealing strips 32, and in view of the fact that the normal position of each of the surface portions 64 is lower than that of the upper edges 38 of the sides of the wagons, the flexible strips 32 will bulge, balloon, or drape from opposite sides of the upper edges 38 of the wagon 16, as illustrated in exemplary manner in FIG. 4. The weight alone of the sealing strips 32, even though relatively slight, will cause such bulging and drooping of the flexible strip sealing members 32 in sealing relationship with the upper edges 38 of the sides of the wagon 16 more or less in the exemplary manner illustrated in FIG. 4.

When a wagon is placed within one of the bays 14 in registry with the sealing means 30, the flexible sealing strips 32 will assume the draped condition shown in exemplary manner in FIG. 4 relative to the upper edges 38 of the sides of the wagon 16. The slidable closure means 26 then is moved suitably to uncover the opening 24 in the duct 18 above the wagon, whereupon the drying air, under appropriate pressure, is discharged from the duct 18 into the open upper end of the wagon. Part of said air under pressure will pass through the elongated space 58 between the inner edges 50 of the sealing strips 32 and the bottom wall 22 of duct 18, thereby placing the inner surfaces of the flexible sealing strips 32 under pressure, as exemplified by the arrows shown therein in FIG. 4, thus enhancing the sealing relationship between said sealing means and the upper edges 38 of the sides of the wagon 16.

By way of example, when the drying air is introduced into the open tops of the wagons, it may be moving, for example, in the range of 5,000 cu. ft./min. per wagon. The resistance to this pressure afforded by the agricultural products within the wagon which are to be dried, is sufficient to cause a substantial positive pressure within the wagon, and this pressure is effective in regard to the interior of the sealing means 32, whereby the pressure within the sealing means 32 is substantial. Further, the stiffened edge 50 of the sealing means insures that the space within which the drying air, under pressure, enters the interior of the flexible sealing means 32 will be substantially uniform throughout the length thereof, whereby effective circumferential sealing between the upper edges 38 of the sides of the wagon and the exhaust opening 24 in the duct 18 is assured at all times.

It will also be noted that the general convexly curved configuration of the flexible sealing strips 32, as viewed in exemplary manner in FIG. 3, for example, is such that there is a minimum possibility of tearing or snagging such flexible sealing means incident to moving a wagon 16 into operative position and removing it therefrom within the bays 14.

While the invention has been described and illustrated in its several preferred embodiments, and has included certain details, it should be understood that the invention is not to be limited to the precise details herein illustrated and described, since the same may be carried out in other ways falling within the scope of the invention as claimed.

We claim:

1. Drying means for drying crops contained in a wagon having an open top and sides and/or a bottom perforated to permit exhausting from the wagon drying air directed into the open top thereof, said drying means comprising an overhead air duct arranged to be connected to a source of drying air under pressure greater than atmospheric and supported with the lower wall of the duct at a predetermined height above a floor surface adequate to permit the top edge of crop wagons of the foregoing type to pass therebeneath with reasonable clearance and said duct also having a discharge opening in said lower wall thereof of a predetermined size which is smaller than the open top of wagons to be placed therebeneath, in combination with flexible and impervious inflatable sealing means connected to the lower surface of said duct and surrounding the perimeter of said discharge opening, said sealing means being arranged to be inflated and thereby urged flexibly away from said duct a predetermined maximum distance downward for yieldable and substantially air-tight engagement with the top edges of the sides of a wagon when placed beneath said discharge opening in said duct to discharge drying air thereinto for drying crops in said wagon, and means to introduce air from said duct into said sealing means to inflate it.

2. Drying means for drying crops contained in a wagon having an open top and sides and/or a bottom perforated to permit exhausting from the wagon drying air directed into the open top thereof, said drying means comprising an overhead air duct arranged to be connected to a source of drying air under pressure greater than atmospheric and supported with the lower wall of the duct substantially horizontal and at a predetermined height above a floor surface adequate to permit the top edge of crop wagons of the foregoing type to pass therebeneath with reasonable clearance and said duct also having a discharge opening in the lower wall thereof of a predetermined size which is smaller than the open top of wagons to be placed therebeneath, in combination with flexible and imprevious sealing means carried by the lower surface of said duct and surrounding the perimeter of said discharge opening, said sealing means having circumferentially continuous substantially horizontal portions positioned a predetermined distance below the lower wall of said duct and arranged to have yieldable wiping contact with the top edges of the sides of a wagon when placed beneath said discharge opening in said duct for drying crops therein and the weight of said flexible sealing means being operable by gravity to effect wiping and sealing engagement with the top of said wagon to effect a substantially air-tight seal between the top edge of said wagon and said duct.

3. The drying means set forth in claim 2 further characterized by said sealing means having opening means to admit drying air from said duct between said sealing means and the lower wall of said duct incident to passing into a wagon and thereby urge said sealing means downward under pressure to effect firm and substantially air-tight sealing contact between said horizontal portions of said sealing means and said top edges of the sides of a wagon when positioned beneath the same.

4. Drying means for drying crops contained in a wagon having an open top and sides and/or a bottom perforated to permit exhausting from the wagon drying air discharged into the open top thereof, said drying means comprising an overhead air duct arranged to be connected to a source of drying air under pressure greater than atmospheric and supported with the lower wall of the duct substantially horizontal and at a predetermined height above a floor surface adequate to permit the top edges of the sides of crop wagons of the foregoing type to pass therebeneath with reasonable clearance and said duct also having a discharge opening in the lower wall thereof of a predetermined size which is smaller than the tops of said wagons, in combination with flexible strip-type sealing means carried by the lower surface of said duct and surrounding the perimeter of said discharge opening, said sealing means being generally rectangular and substantially complementary in shape to the top edges of the sides of a wagon to be placed beneath said discharge opening in said duct for drying crops in said wagon, and means connecting said strip-type sealing means tightly at one edge against the lower surface of the lower wall of said duct and the other edge being adjacent but spaced from said lower wall to provide access space to permit the introduction of air under pressure between said strip means and said lower duct wall to effect downward bulging of the intermediate portions of said strip-type means to a predetermined level which is at least slightly below that of the top edges of the sides of a wagon to be placed beneath said duct discharge opening, whereby the upper edges of the sides of a wagon engage the bulging intermediate portions of said strip means and the internal air pressure therein effects a yieldable air-tight seal between said top edges of said wagon and said duct.

5. The drying means set forth in claim 4 further including means to maintain the innermost edge of said sealing means substantially straight and evenly spaced from said lower wall of said duct a shorter distance than that which the intermediate bulging portions of sealing means are spaced away from said lower surface of said duct.

6. The drying means set forth in claim 5 further including straight stiffening means connected to said innermost edge of said flexible sealing means to maintain the same straight during use and insure substantially even ingress of air under pressure between said sealing means and said duct substantially throughout the length of said sealing means.

7. The drying means set forth in claim 6 further including hanger means connected to said lower wall of said duct and comprising a channel spaced below said lower wall of said duct and facing upwardly, said channel receiving said stiffened innermost edge of said sealing means to support the same in spaced operative position relative to said duct.

References Cited by the Examiner

UNITED STATES PATENTS

| 761,025 | 5/04 | Aregood | 34—214 |
| 2,725,643 | 12/55 | Ransohoff | 34—242 |

FOREIGN PATENTS 583,456   10/24   France.

WILLIAM F. O'DEA, *Acting Primary Examiner.*
NORMAN YUDKOFF, *Examiner.*